US005163012A

United States Patent [19]

Wuhrl et al.

[11] Patent Number: 5,163,012

[45] Date of Patent: Nov. 10, 1992

[54] APPARATUS FOR CARRYING OUT THE COMPREHENSIVE QUALITY CONTROL OF PRINTED SHEETS

[75] Inventors: Arno Wuhrl, Muhlheim/Main; Oded Zingher, Alzenau, both of Fed. Rep. of Germany

[73] Assignee: MAN Roland Druckmaschinen AG, Fed. Rep. of Germany

[21] Appl. No.: 558,200

[22] Filed: Jul. 24, 1990

[30] Foreign Application Priority Data

Jul. 24, 1989 [DE] Fed. Rep. of Germany ....... 3924989

[51] Int. Cl.[5] .............................................. G06F 15/46

[52] U.S. Cl. ...................................... 364/552; 364/525

[58] Field of Search ............... 364/552, 525, 526, 559, 364/560; 358/107; 382/8; 356/401; 250/561; 101/DIG. 45, DIG. 46, 365

[56] References Cited

U.S. PATENT DOCUMENTS

| | | | |
|---|---|---|---|
| 4,318,003 | 3/1982 | Ono et al. | 356/401 X |
| 4,418,390 | 11/1983 | Smith et al. | 364/526 |
| 4,518,862 | 5/1985 | Dorn | 250/561 |
| 4,557,599 | 12/1985 | Zimring | 356/401 |
| 4,583,186 | 4/1986 | Davis et al. | 364/526 |
| 4,639,776 | 1/1987 | Foerster et al. | 358/107 |
| 4,641,244 | 2/1987 | Wilson et al. | 382/8 |
| 4,648,048 | 3/1987 | Dorn et al. | 364/526 |
| 4,649,502 | 3/1987 | Keller et al. | 364/526 |
| 4,651,341 | 3/1987 | Nakashima et al. | 382/8 X |
| 4,660,158 | 4/1987 | Zingher | 364/559 X |
| 4,665,496 | 5/1987 | Ott | 364/526 |
| 4,802,107 | 1/1989 | Yamamoto et al. | 364/525 |
| 4,809,198 | 2/1989 | Terashita | 364/525 |
| 4,849,914 | 7/1989 | Medioni et al. | 364/526 |
| 4,851,903 | 7/1989 | Ikeda et al. | 358/107 X |
| 4,938,600 | 7/1990 | Into | 358/107 |
| 4,977,832 | 12/1990 | Walter | 101/365 |
| 5,018,213 | 5/1991 | Sikes | 382/8 |

FOREIGN PATENT DOCUMENTS

| | | | |
|---|---|---|---|
| 3232490C2 | 3/1983 | Fed. Rep. of Germany . | |
| 3325006A1 | 6/1984 | Fed. Rep. of Germany . | |
| 0009383 | 10/1989 | World Int. Prop. O. | 364/526 |

OTHER PUBLICATIONS

IBM Technical Disclosure Bulletin, vol. 19, No. 3, Aug. 1976, p. 815.

Mason, R. "Specification and Control of Process Color Images by Direct Colorimetric Measurement" *T.A.G. Proceedings*, 1985, pp. 526–544.

*Primary Examiner*—Parshotam S. Lall
*Assistant Examiner*—Michael Zanelli
*Attorney, Agent, or Firm*—Leydig, Voit & Mayer

[57] ABSTRACT

A quality control system for a printing plant adapted to efficiently and accurately correlate information needed for printing quality control, which information had required at least an element of human mental correlation in the past. A printing console has a video camera aimed at a printed sheet on the console, a light source having a position related to that of the video camera, measuring devices such as scanners for measuring particular areas of the printed sheet, and control keys for zonal press controls such as control of zonal ink supply. A processor is associated with an image memory adapted to create an electronic image of the printed sheet on the table. The processor also has access to a reference memory in which is stored a further representation of the image along with coordinates for quality control zones. The processor correlates the image created by the video camera with the reference image in order to associate the quality control zones from the reference image with the actual sample on the table. The processor then operates a display device with respect to the actual sample on the table.

18 Claims, 2 Drawing Sheets

APPARATUS FOR CARRYING OUT THE COMPREHENSIVE QUALITY CONTROL OF PRINTED SHEETS

FIELD OF THE INVENTION

This invention relates to printing presses, and more particularly to a system for improving the quality control of the printed image.

BACKGROUND OF THE INVENTION

Typical of the quality control operations performed in a printing plant is the control of image quality exercised by zonal ink adjustments to produce printed density and printed color within a desired set of standards. Often the standards are established by a proof sheet, and the operator attempts to make press adjustments to produce a printed sheet which matches the proof. As is well known, ink is typically adjusted in zonal increments across the width of the press, the zonal increments being on the order of one or two inches, and the final adjustment to produce an acceptable image across the sheet requires a good deal of skill and experience on the part of the operator.

Printing consoles typically provide a surface for holding a printed sheet, to allow the operator to mentally associate the image on the printed sheet with the control keys which operate the zonal ink adjustment. Often the sheet is manually positioned on the support, and the manual positioning determines the relationship between the image and the control keys. Thus, if the operator incorrectly positions the sheet, or if the image is not correctly positioned on the sheet, there can be a misregister between the keys which control the ink and the actual printed image on the sheet.

Various schemes have been devised for assisting the operator in correlating the printed image on the sheet with the controls which control the printing. Among such systems is that shown in U.S. Pat. No. 4,639,776 which uses a video camera to produce an electronic image of the printed image of a sheet disposed on the console. An image mixer serves to mix the video image of the sheet with internal information relating to ink zones, and to display such mixed information on a separate CRT. The CRT thereby displays the entire printed image and correlates the printed image with the zones for adjustment. However, it does not directly correlate the ink keys on the console with the zone, and thus it requires a measure of operator correlation in order to produce a desired correction to bring the image into conformity with the proof. The problem is made even more complex because the CRT is a relatively small device positioned at the side of the display console, and it requires concentration on the part of the operator to correlate the large printed image with the offset and much smaller displayed image. Furthermore, if the printed sheet is disposed on the table in an incorrect position, the video image displayed on the CRT will not be correctly aligned with the display zones, since the system requires at the outset the physical positioning of the sheet to provide a correlation between the printed image and the control zones.

Systems have also been devised for correlating the position of the sheet with control zones, but they are not entirely satisfactory. For example, German patent document PS 3,232,490 describes a method and apparatus for ascertaining and evaluating ink measuring zones on a printed sheet. The sheet position is taken into account by means for sensing the position of the printed sheet on the console. The sheet position is sensed by scanning elements at the sheet edges, and a computer converts predetermined points for quality control to the new coordinates defined by the altered position of the sheet. As a result, the ink zones can be correlated to the image on the sheet in its actual position on the table, assuming the image is in its expected position on the sheet. However, to the extent the image position varies on the sheet, errors will be introduced. In addition, sensing of image position by such indirect means as sensing of sheet edges results in a reasonably complex system subject to operational problems.

SUMMARY OF THE INVENTION

In view of the foregoing, it is a general aim of the present invention to provide a system for quality control of a printing operation in which the actual printed image is correlated to quality control information stored within a processor. In a preferred implementation of such system, the image itself serves as an important element in the correlation such that image position defined quality control points in the processor are directly related to points in the printed image, thereby eliminating the mental correlation which has heretofore been required.

In that respect, it is an object of the present invention to provide a quality control system which stores reference information including image information correlated to quality control points, and derives actual image information by means of a video scanner, then correlates the stored quality control points from the reference image to the actual image scanned by the video scanner.

Thus, it is a resulting object to provide quality control which eliminates mental correlation to the greatest extent possible by pointing on the actual printed image to points defined in the processor for purposes of quality control.

It is a feature of the invention that a reference image stored in the processor is correlated to an actual video image scanned from a sheet in order to correlate quality control points defined for the reference image to corresponding points in the actual printed image.

It is a further feature of the invention that the quality control points can be defined off-line and outside of the pressroom, such as in quality control. For example, according to this aspect of the invention, a standard video display terminal can be utilized to display the printed image, and a standard cursor control can be used to define points in the image for quality control, such points being stored in the reference image memory for later use during running of the printing press.

According to this aspect of the invention, the reference image thus created is used during actual printing for correlation with a scanned image of a printed sheet, the correlation serving to translate the quality control points stored in the reference image to actual points on the printed sheet for quality control.

Thus, the requirement that the operator exercise judgment in coordinating different displays, or in coordinating relative positions of a printed sheet to a control panel or to an ancillary video display is eliminated.

As a further feature of the invention, the display means associated with the console which is utilized to identify particular quality control points on the image can also be used to display ink setting parameters on a zone-by-zone basis, such ink setting parameters being keyed to positional information in the reference memory but displayed in conjunction with the actual image position as sensed by the video camera.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
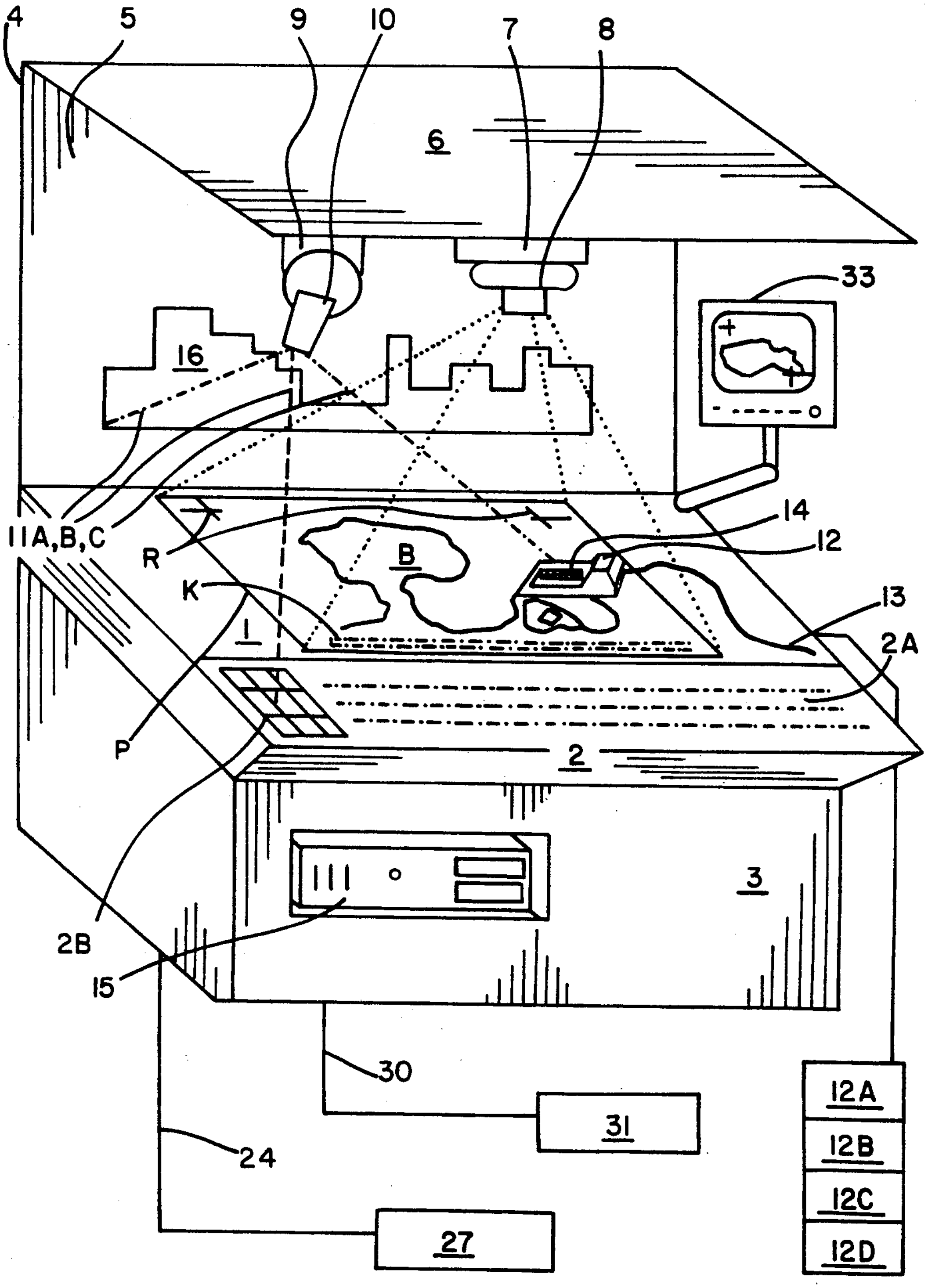
FIG. 1 is a perspective diagram illustrating a control panel constructed in accordance with the present invention and including block control elements utilized in a quality control system exemplifying the present invention.

Turning now to the drawings, FIG. 1 shows a single work station which includes all of the elements which can be interfaced in a system according to the invention. It is noted, however, that in a typical system the various work stations will include only certain subsets of such items, as will be better described in connection with FIG. 3. FIG. 1 shows a control console 2 having a plurality of control devices associated with a matching table 1 adapted to support a printed sheet P. As in the prior art, a guide or rail is provided on the console 2 for guiding one edge of the printed sheet P, and the operator attempts to position the sheet P in a predetermined relationship to the zonal control keys 2A which control ink metering devices 26 (FIG. 2) on a zone-by-zone basis. A second array of control keys 2B represents a further adjustment which can be a register adjustment or a zonal water control adjustment, as examples. The control console 2 is an element of a cabinet 3 which contains electronic components for the unit including a central processing unit 15 which is preferably a microprocessor based control containing a stored program of instructions adapted to carry out the functions to be described in detail below.

Disposed above the work table 1 is a canopy 6 which is adapted to shield the work surface from external light and also is adapted to mount a video camera 7 and light source 9 in predetermined relationship with respect to each other and to the work table 1. The video camera 7 has a lens 8 which is directed toward the table 1 so that the camera 7 is adapted to scan the printed image B which is on the sheet P disposed on the work surface 1. Mounted in parallel to the camera 7 is the light source 9 having a lens 10 which transmits collimated beams 11A, 11B and 11C. The light source 9 and its lens 10 are controlled by the internal processor 15, as will be described in greater detail below, to use beams 11A, 11B and 11C as display means for correlating actual image data with control points and measurement points for the system. The beam 11A is shown to be directed at a display panel 4, preferably in the form of a fluorescent screen 5, for providing a display 16 of control setting on the press on a zone-by-zone basis in their appropriate relationship to the image disposed on the table. Beam 11B is aimed at the console 2 and is used as an indicator for particular ones of the keys with an array 2A, 2B and thus demonstrates to the operator which of the array of adjustment keys are adapted to control a particular point at issue in the quality control procedure. Beam 11C is aimed at the image B on the sheet P, and serves as an indicator for a particular point, such as quality control point at which a measurement is to be taken. FIG. 1 shows a measuring device 12 in the form of a scanning head, such as a densitometer head, connected by cable 13 to the electronics within the console 3. The light beam 11C directed by light source and lens 10 to the image B identifies a particular point on the image B at which the measuring device 12 is to be located, to guide the operator in taking the measurement needed by the system at that time.

The system of FIG. 1 also includes an auxiliary CRT display 33 adapted to display a manipulatable electronically controlled image of the sheet to be printed. As will be described in greater detail below, the image displayed on CRT 33 can arise from that obtained by means of the video camera 7, or can arise from other sources and serve in the nature of a proof for use in quality control. The operator can manipulate the image on screen 33 as by a conventional cursor control to specify locations K for taking densitometric measurements or other locations R for identifying registration marks, and the system will ultimately function to correlate those specified points in an electronically stored reference image to actual points on the printed sheet.

The scanning device 12 can take many forms, and the block diagram at the lower portion of FIG. 1 indicates a variety of such forms. For example, the measuring device 12 can take the form of a densitometer 12A, colorimeter 12B, register measuring device 12C, or hand scanner 12D. To distinguish one type of measuring device from another, marking means 14 are associated with each scanner and contain a recognizable visible pattern adapted to identify the type of scanner in question. The video camera 7 is adapted to image not only the printed sheet, but also the superimposed measuring device 12 with marking 14, and thus insure that the appropriate measurement is being taken at the correct place not only by observing the position of the scanning device, but also checking its identity by means of marking 14.

As is conventional, the electronic devices within the console 2 can be configured to communicate via data lines 24 to a centralized printed control 27. The processor within the console 3 can also be adapted to communicate via interface lines 30 to a network 31, such as a local area network which connects all of the compatible computing or communication devices within the printing plant. The local area network 31, as will be described in greater detail below, provides the opportunity to segregate functions in the print shop such that the quality specification aspects of the job are assigned to the makeup department where they are most appropriately handled, whereas the actual checking of the quality according to a pre-established program is assigned to the pressroom where the printing is actually accomplished.

Figure 2:
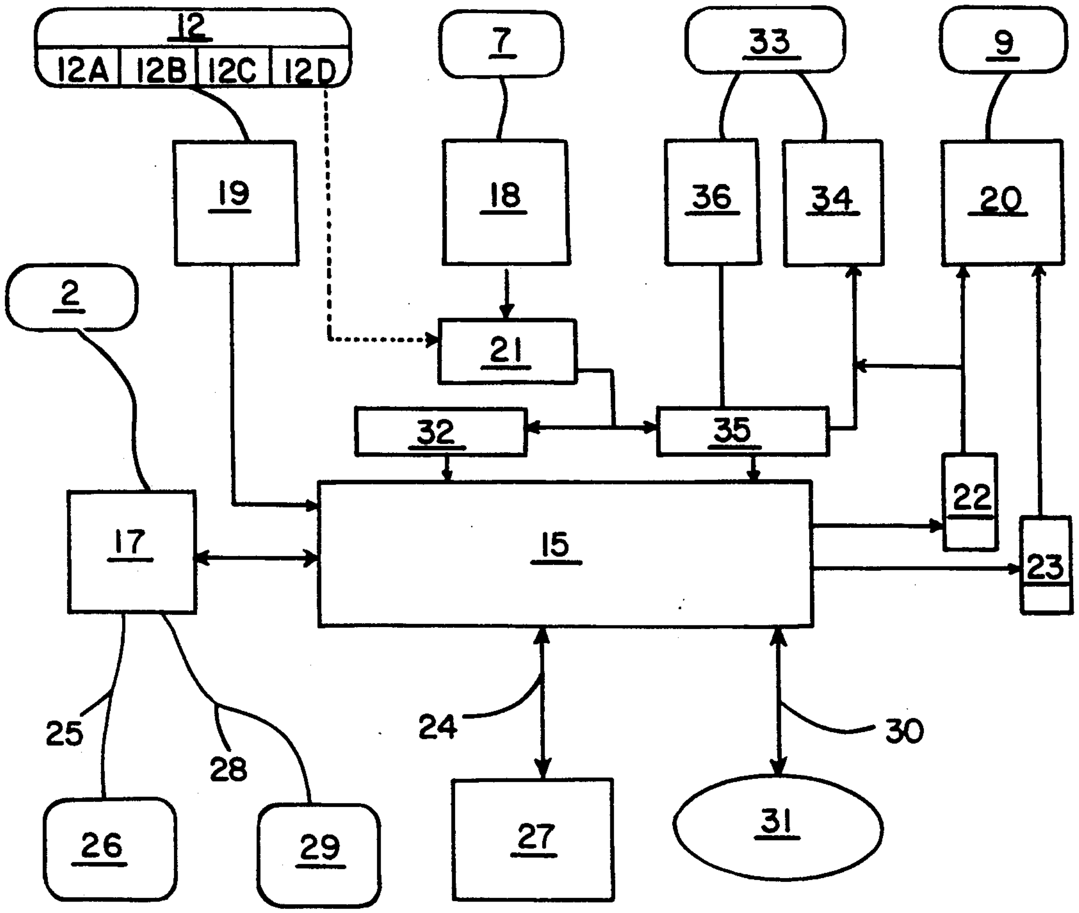
FIG. 2 is a block diagram illustrating the interrelationship between the control elements of a system exemplifying the invention.

FIG. 2 shows in block diagram form the elements of the system of FIG. 1 and their interrelationship. The electronic elements of the control console 2 are shown as being connected to a control interface 17, which in turn is connected to the central processing unit 15. The ink metering control devices 26 and register adjusting devices 29 are also connected to the interface 17. The interface 17 provides means for direct control of the ink metering devices 26 or register adjustments 29 by means of keys 2A, 2B in the console 2, or, during computer controlled operation of the device, interposes the central processor 15 in the control path.

The measuring means 12 are also schematically illustrated in FIG. 2, and as noted before, include densitometer 12A, colorimeter 12B, register measuring device 12C, and hand scanner 12D. All of such elements are connected to an interface 19 which in turn is connected to the central processing unit 15.

In practicing the invention, the video camera 7 is connected by means of a video interface 18 to a video image memory 21 adapted to store actual image information relating to the image B on the sheet P disposed on the work table 1. The information within video image memory 21 is then available for comparison by the processor 15 with reference information stored in a reference memory 32, as will be better described below. Suffice it for the moment to note that the video camera 7 is operated by the processor 15 under the control of interface 18 to store image data in the video image memory 21 which relates to the actual subject matter on the work table 1 which includes not only the form of the sheet P disposed on the table, but also the form and location of the scanning device 12 as it is moved across the table.

The light source 9 is shown to the right of FIG. 2 and functions through an interface 20 to produce the beams 11A–11C described above. For purpose of directing those beams, the interface 20 is coupled to an image memory 22 and a coordinate memory 23 which in turn are driven by the processor 15. The coordinate memory 23 is best suited for storing coordinates of measuring points, such as the positions where densitometric or colorimetric measurements are to be taken. Thus, the processor 15 acting through coordinate memory 23 is adapted to direct one of the light beams, such as light beam 11C, to a particular set of coordinates on the table, and the processor assures that those coordinates are in a predetermined relationship to the image. The user can then position a measuring device 12 in the indicated position to take a measurement desired by the quality control system.

The image memory 22 is best suited for control of the display screen 5, and stores, for example, zone-by-zone measurements for display of profiles such as profile 16 indicated in FIG. 1, showing ink adjustments across the press for one of the ink fountains. The image memory can just as well store register data, water control data and the like; suffice it to say that image memory 22 allows the system to direct one of the beams 11A of the light source 9 to the display 5 in such a way as to produce a display of control or image information coordinated to the position of the sheet on the table for any desirable purpose in quality control.

The lower portion of FIG. 2 illustrates the overall printing press control 27 as a block element connected to the central processor 15 by means of data lines 24. That portion of the figure also shows the overall printing shop network 31 connected by means of an interface cable 30 to the quality control computer 15. The shop network 31 can, as will be described below, serve as a basis for important quality control information utilized in the overall operation of the system.

The auxiliary CRT display 33 is also shown as an element of FIG. 2 and is interfaced with a control means 34 which controls the image shown on the display 33, and a cursor control 36 adapted to controllably position a cursor on the screen 33. An image processing device 35 interfaces the control means 34 and cursor control 36 to the central processor 15, and allows for manipulation of the image, such as by enlarging, rotation and the like. In addition, the image processing system 35, which can be of conventional construction, allows the identification in the processor 15 of particular points identified by the cursor control 36 on the image, so as to allow the inputting and storage of particular points in the image which represent quality control points or zones.

For the purpose of storing control points, a memory 32 is associated with the processor 15 and with the image processor 35 and video image memory 21 as illustrated in FIG. 2. The element 32 can be considered a sample recognition device in that it operates with the video image memory 21 which has information relating to the actual image and with the processor 15 having information relating control zones to the stored image, so as to associate stored control information with the actual image on the table.

In its preferred form, the sample recognition element 32 comprises a reference image memory adapted to store sufficient image data for comparison with the information in the video image memory so as to match a stored reference image with the actual video image. The stored reference image 32 has associated therewith control information for selected quality control points which can include control zones for the press as well as measurement points related to the image. Thus, for example, a particular highlight portion of the image B can be identified for the taking of a particular colorimetric or densitometric measurement. When the video camera 7 scans a printed sheet on the worktable 1, the image in video image memory 21 is matched with the image data in reference image memory 32 to correlate the two. Having correlated the two images, the measurement point which had been associated with the reference image in the memory 32 is then automatically associated with the actual image stored in video image memory 21. The processor 15 then has information necessary for performing a coordinate transformation in the coordinate memory 23 and causing the light source 9 to illuminate the predetermined point on the actual image B as it lays on work table 1 to scan the particular point in the image which had previously been identified and stored in reference image memory 32.

Returning to the reference image memory 32, such memory can typically be configured as a section RAM or a section of disk memory associated with the processor 15 which stores reference image information for the quality control operation to be performed. Thus, the memory section 32 stores image data which can relate to the entire image to be printed or to key elements, but nevertheless sufficient data to allow the reference image and the scanned image in video memory 21 to be correlated. The reference image in the memory 32 has associated with it various control information for the quality control operation. Thus, the memory 32 has coordinates with respect to the reference image stored for measurement points at which densitometric, colorimetric, or register measurements are to be taken. Similarly, when different measuring devices 12A-12D are to be used, the reference image memory 32 stores an indication of the type of scanner intended to take a particular measurement. The information allows the light source 9 to direct the various beams 11A-11C to a particular point for displaying to the operator indication and correlation. Thus, the reference image memory 32 has stored with respect to the reference image all of the control points specified for the quality control operation. When a video image of an actual image on the table is scanned by means of camera 7 and input to video memory 21, the processor then causes the reference image to be compared with the video image. The processor then makes a translation of coordinates from the reference coordinates to the actual image coordinates, so that the processor then has detailed information on the actual location of the image on the table, and can thus correlate for the operator the actual image points at which control operations are desired. The display is operated to demonstrate to the operator the various control operations to take. For example, the light beam 11C is positioned on the table 1 over the image B to indicate a particular point for positioning of a measuring device 12. The light beam 11B is directed to particular keys within the array 2A, 2B for showing the control actions to be taken. The light beam 11C can generate a display on the screen 5 showing the actual adjusted positions for the control elements in question and can, if desired, highlight individual ones of those adjustments where a further adjustment is desired. The operator is not required to make mental correlations between the image on the sheet and the control elements as that correlation is made by the processor 15 upon comparing the previously stored sample information in the reference memory 32 with the newly acquired video image information in the video memory 21. Whenever the sheet is moved or a new sheet is placed, the video camera is adapted to refresh image memory 21 so the correlation remains current. Indeed, as a measuring device 12 is moved across the table to approach an indicated measuring point, the video camera 7 continues to record the change in position of the measuring device 12. Not only is the position recorded, but the video camera 7 senses the marking 14 on the measuring device 12 being used and can thus assure that not only is the correct point being measured, but also the correct measurement being taken.

In operation, the central processor 15 is first utilized to collect data for orientation of the device, such as the sheet format, the nature of the measuring means 12 to be used for a particular quality control operation, and the nature and construction of the proof. Such information can be input by means of the keyboard 2A of the control console 2. However, as alternates, the machine control 27 can automatically or manually input such information into the processor 15, or such information can come from other parts of the printing plant by means of the shop network 31. When the central processor 15 is configured as a personal computer, diskettes containing the print job specification can simply be inserted into the personal computer for entry of such information.

A dotted connection is shown between hand scanner 12D and video image memory 21. That is intended to indicate that a hand scanner can be used to indicate position on the printed image, much as the cursor control 36 can be used to electronically move a cursor across the electronic image in CRT display 33. Thus, setting up of control points can be accomplished electronically using the cursor control 36 on the video image 33 or using an actual hand scanner to specify positions on an actual proof of the printed image utilizing the console 2.

The data as thus entered is used for general setup of the system. For example, it is used to preset the video camera 7 in accordance with sheet size, such that scanning need only take place over the actual size of the sheet rather than the entire area of the display table. The setup information also selects the particular nature of the measuring means 12 to be used for particular operations. In the case where ink control zones K and register control zones R are specified in particular portions of the sheet, the location of such points and their coordinates can be specified in the setup operation. As an alternative, the measuring zones K and register points R can be specified during an orientation step using hand scanner 12D or cursor control 36 as has been described.

The reference information is thus made available to the processor 15 and stored in an appropriate format in the reference image memory 32. In addition, the coordinate memory 23 and the image memory 22 are set up at least in part using such preliminary setup information. The nature of the image to be scanned can also be set up in this initial step. If an electronic version of the image is available, it can be entered from the machine control 27 or the local area network 31, such that sufficient information for matching with an actual video image is stored in the sample recognition memory 32. If an electronic image of the proof is not available, the video camera 7 can be used to make an electronic image of the proof, and to extract adequate information from that image for storage in the reference image memory 32. In any event, the image data thus obtained is stored along with coordinate data for the sample points, for the ink control zones on the press, and the like in sample recognition memory 32 so that it is available for matching with actual image data and for providing correlation information to the operator.

It has been noted that the coordinate memory 23 can be used to direct a light beam onto the image B on the display table 1 to specify the position of a measuring device 12. In a highly automated form of the invention, the beam 11C directed by the coordinate memory 23 through the light source 9 serves to actually trigger the measurement after appropriate positioning of the measuring device 12. Thus, the measuring device 12 includes not only a marking 14, but an associated optical receiver within the marking area 14 which, when intersected by the beam 11C causes the taking of a measurement at the actual place desired by the quality control system. In a less automated version, the beam 11C simply directs the scanner to the appropriate location for positioning by the operator, and after positioning, the operator by means of a pushbutton or the like actually initiates the measurement.

During the course of such measurements, the sample recognition module 32 directs the position of the measuring means 12 by way of a display from the light source 9, monitors the nature of the measuring means 12 by means of the video image of the marking 14 and thus guides the operator to the point on the actual image where the stored reference information indicates a sample is to be taken. Thus, the operator is guided directly to a particular portion of zone K or register mark R before a measurement is allowed. It is therefore possible to provide guidance over all of the zones of the printed image B with sensing of control zones K, register marks R and such parts of the image as are important or susceptible to problems. The light source 9 acting through beam 11A displays the results of the measurement on screen 5 in the forms of a graphic display 16. To that end, the screen can be fluorescent or a light and contrast-enhancing material. The data thus generated is then directed by means of data lines 25, 28 to the ink metering device 26 and register adjusting device 29, respectively. Alternatively, the operator can respond to beam 11B directed to individual keys within the array 2A, 2B to effect desired control over the zone in question. As a further example, the input device 2B for register control in the console 2 can be arranged as a sensor matrix whose sensor elements can output adjustment positions for the register adjustor 29. Illuminating of the sensor matrix with the collimated light beam 11B from light source 9 thus produces adjustment commands for any required measured values output by the register measuring device 12C.

While the system is susceptible to numerous modes of operation, as will now be apparent, the following example of operation is provided to indicate a typical mode. It will be appreciated tha the requirements of different print shops may utilize the system in different ways. However, the thrust of the following description is intended to convey the importance of the automatic correlation of stored image data relating to control points and measurement zones with actual image data obtained by a video camera, and the resulting correlation provided by the system in directing the operator to the points on the printed image correlated to the stored points in the reference memory. With that in mind, a typical example of operation of the system will now be provided.

A printed sheet is placed on the matching table 1 as reference sheet and photographed by the video camera 2. Marginal conditions such as format, measurement process, measurement devices, machine configuration and number of colors can be supplied by the network 31 where they are stored in a data bank. The lens 8 can therefore be adjusted to sheet size and the sample recognition 32 triggered both for the necessary measuring devices 12 and also for any control zones K and register marks R which may be present.

After storage of the print image B it is determined where in the quality control measurements are to be made. To this end, a predetermined measurement procedure can be programmed directly at the sheet P by means of the measuring means 12, each such means 12 approaching the necessary measurement stations for this purpose. To this end, the measuring means 12 have direction-finding means, for example, in the form of a cross-hair magnifier. The video camera 7 photographs the markings 14 of the measuring means 12 and by means of the sample recognition 32 calculates the position whose data are stored in the coordinates memory 23.

Another possibility is to evaluate the printed image B on a CRT 33. By means of an image-processing system 35 details in the printout can be detected in the enlarged representation of the photographed image B placed in the memory 21, so that better decisions on quality control can be taken. Also, the preparations for quality control need not then take place at the control console 2 of the press or quality control can proceed without the presence of the sheet P at a separate work station for job preparation. The image data are made available by way of the network 31 to the person preparing the job. The video photographs from the image memory 21 are displayed on the screen 33 by means of a control device 34. When the image B is being viewed the measurement stations can be defined in a simple manner in the image-processing system 35 by means of a cursor control 36. If, as shown, these jobs are performed at a special work station, the data are transmitted, for example, over the network 31, to the computer 15 of the press.

In special measurement procedures, control zones for ink metering must be determined over the width of the sheet P. The ink-zone related programming is defined before the measurement stations are determined. To this end a zonal division or a display of the presetting for ink metering in accordance with the display 16 using data from the image memory 22 can be superimposed, for example, on the screen 33 by means of the control device 34, with the printed image from the image memory 21 so that zonewise relationships between inking and printing image division become recognizable. However, this method is unsuitable for the remote adjustment of inking zones since there is no association between the display on the screen 33, the image B and the keyboard 2A.

When all the adjustments have been made, the press is started and the first sample sheets can be removed for quality control. The procedure and possibly the time of the measurement are then determined by the computer 15 in accordance with the instructions of the person preparing the job. After the sheet P has been placed on the matching table 1, the sample recognition 32 detects by means of prominent zones the position of the image B and thus determines an up-to-date coordinate system for the sheet P which is corrected even in the event of subsequent sheet slippage. The previously determined measurement stations for the coordinates memory 23 are recalculated with reference to the new coordinates system. The light source 9 uses the new values to trigger the measurement stations individually by means of its light beam 11C which serves as a pointer. A measuring device 12 is activated in parallel and the use of the correct device 12 is checked by the sample recognition 32 using the video image of markings 14. If positioning is correct, measurement can proceed automatically. Triggering is effected in this case by a positive signal of the sample recognition 32 or by the light beam 11C which a sensor of the device 12 detects in the measurement position. When the pressman determines in the quality control that there are further critical points, for example, by reaction during inking with disadvantages zonal division, the pre-set procedures for zonal division and measuring station location can be directly corrected and/or amplified at this place during quality control. The pressman therefore does not have to worry about all the critical points since the main zones and measurement stations have been predefined. The pressman can therefore devote his undivided attention to the printing process over its whole width or to special points. When ink metering is controlled manually, the profile of the ink zone adjustment can be shown on the display 16, so that its association with the image B and the keyboard 2A is ergonomically optimal. The register adjuster 29 is guided in just the same way as the ink-metering device 26. New adjustment values can be input to the input device 2B of the register control manually or by means of the light beam 11B. In this event the input device 2B is in the form of a sensor matrix.

The system adapts itself to segregation of the quality control function between the special job preparation sites such as might be accomplished in the makeup department, and further quality control operation during printing. At the first station, highly skilled personnel can specify the procedures for quality control. That can involve the specification of control points, measurement zones, association of press control zones with the image, and the like. That information is electronically stored and is then transmitted to the processor 15 in the pressroom at which the quality control function is accomplished. The press operators are thus relieved of all of the preliminary work in quality control, and the error rate in quality control should substantially decrease. It is for this reason that it is not necessary for all of the elements of the control system to be located at each of the work stations. For example, in the makeup area, there is typically no need for a video camera or for a control console 2, whereas a video display terminal 33 with cursor control and the like would adequately suit that station. Similarly, in the pressroom where the console 2 and its associated elements, along with the video camera 7 and light source 9 are needed, there is typically no need for a separate video display terminal 33.

Figure 3:
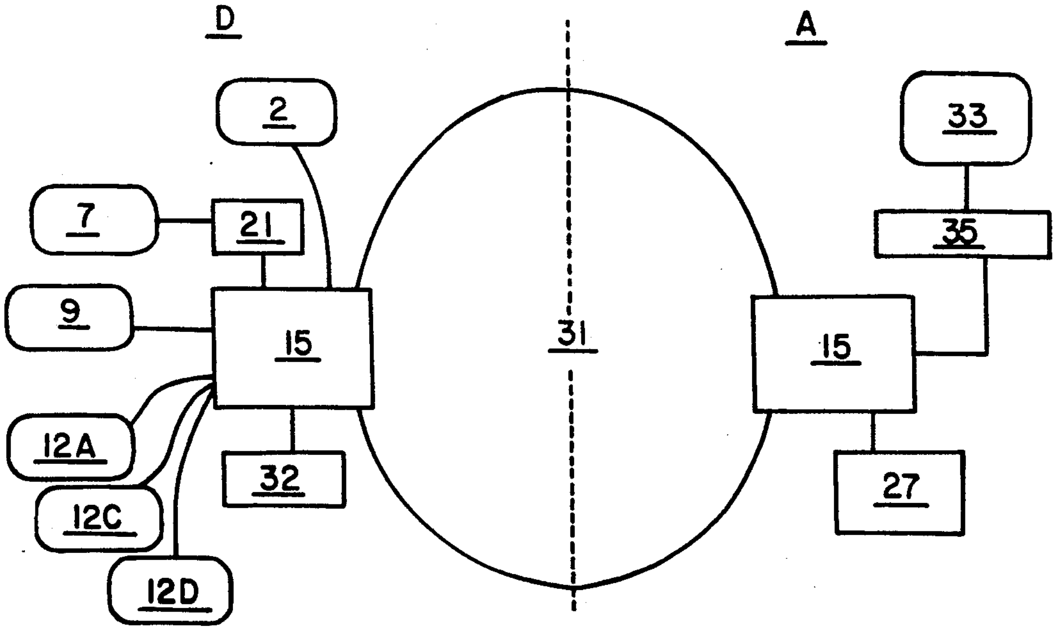
FIG. 3 is a diagram illustrating a system according to the invention with two control stations adapted for different functions in the quality control operation.

A configuration as outlined above is better shown in FIG. 3. The central portion of FIG. 3 is illustrated as a local area network 31 linking a pair of central processors 15. A station A contains a first of the processor 15 and is intended to symbolize a makeup station. In the makeup station, the machine control 27 is shown as a source of preliminary setup data and the main control elements are illustrated as the CRT display 33 and image processor 35. It will be appreciated that the cursor control 36 and CRT control 34 are incorporated within the elements at station A. In any event, preliminary setup data with respect to the sheet as well as preliminary information data can come from the central machine control 27 (or from the network 31), and that information is manipulated primarily on the CRT 33 by means of conventional electronic controls. By that means, an operator in the makeup section can specify the quality control points, the measurement points, the control zones, and their overall relationship to the image simply by manipulation of data on the CRT 33.

The station D is intended to represent the pressroom quality control station. The central processor 15 at the station D is shown as being connected to the video camera 7 and image memory 21, as well as to a light source 9. Those are the elements which, it will now be apparent, serve to capture actual image data, and to provide a display means for correlating the stored control information with the actual image. The console 2 is indicated as being connected to the processor 15 as are the measuring devices 12A–12D. The sample recognition memory 32 or, as it is sometimes referred to herein, the reference image memory 32, is shown as being an important element of the station D. It is the section of memory 32 which is loaded by the information generated at the station A to correlate the control information with the reference image. The processor 15 then uses that information along with the on-line information acquired by video memory 21 to drive the display 9 and guide the operator through the quality control operation without the need for the operator to make mental correlations.

It will thus be appreciated that what has been provided is a quality control system for a printing press which has great flexibility but which in any event eliminates the need for the operator to mentally correlate the printed image with the control elements on the console or the display elements on the console. The control points are initially associated with a reference image in a preliminary stage. That stored reference image with control points is then available for comparison with an actual image acquired through a video camera, and the processor makes the necessary coordinate transformation to utilize display means and guide the operator to the actual measurement points and control points all under the control of the stored program.

What is claimed is:

1. A system for deriving quality control information from printed sheets produced on a printing press, the press having zonal control devices including zonal ink metering means for controlling the print quality of corresponding zones of the printed image, the system comprising, in combination:

a console having a table for supporting a printed image, display means, and a zonal control panel interfaced to the zonal control means; a video scanner associated with the console for scanning the printed image and creating an electronic representation thereof;

processor means including means for receiving the electronic representation of the scanned image from the scanner for processing as a scanned image;

a reference image memory interfaced to the processor means, the reference image memory storing reference image data for corre`ating with the scanned image, the reference image memory also including means for associating selected quality control points, which include control zones and measurement points, with the reference image;

the processor including means for correlating the reference image to the scanned image so as to transfer said quality control points to correlated points on the scanned image;

the processor including means for driving the display means to identify correlated points on the image printed on the scanned sheet.

2. The combination as set forth in claim 1 further including measuring means for localized sensing of printed image quality at selected points, the reference image memory including means for correlating the position f the measuring means with respect to predetermined quality control points at which measurements are to be taken, the processor operating through the display means to indicate said preselected quality control points on the image for positioning of the measuring means at said points.

3. The combination as set forth in claim 2 wherein there are provided a plurality of measuring means for measuring different image characteristics, visible markings on the respective measuring means for indicating the nature of the measurement made by the respective measuring means, said markings being visible to the video scanner such that the scanned image is superimposed with an image of the marking from the measuring means, the reference memory including means for associating a particular type of measurement wit a particular quality control point in order to correlate the measuring means type with the measurement to be made.

4. The combination as set forth in claim 2 in which the display means comprises a first light source having an output beam aimable at the sheet supported on the table, the processor including means for aiming said beam to highlight correlated quality control points on the printed image supported on the table.

5. The combination as set forth in claim 4 wherein the display means comprises a second light source and a projection screen for displaying an image projected by said second light source, the processor means including means for projecting the second light source on the projection screen for displaying correlated zonal information derived from the scanned image and the reference image onto the projection screen.

6. The combination as set forth in claim 5 wherein the display means comprises a third light source aimable at the zonal control devices on the console, the processor including means for aiming said third light source to highlight selected ones of zonal control devices.

7. The combination as set forth in claim 5 wherein the projection screen has a contrast enhancing or fluorescent surface for retaining the image projected by said further light source.

8. The combination as set forth in claim 4 wherein the light beam is a collimated light beam emitted by a laser source.

9. The combination as set forth in claim 4 in which the measuring means includes a register control scanner having a sensor matrix illuminated by said beam for the display, the processor including means for detecting the beam position from said sensor matrix and operating register adjusting means in response thereto.

10. The combination as set forth in claim 4 wherein the measuring means comprise a densitometer with markings identifying said densitometer, a colorimeter with markings identifying said colorimeter, and a hand scanner with markings identifying said hand scanner.

11. The combination as set forth in claim 10 wherein at least one of said measuring means includes a light responsive sensor for triggering the measuring means for making a measurement when illuminated by said beam from the display means.

12. The combination as set forth in claim 10 wherein the image memory stores markings of the measuring means sensed by the video scanner, and wherein said reference image memory comprises means for associating a particular measuring means with particular quality control points.

13. The combination as set forth in claim 1 wherein the display means comprises an image memory and a coordinate memory, the processor including means for storing coordinates in the coordinate memory relating to the correlated quality control points taken form the reference memory and correlated to the image scanned by the video scanner, thereby to cause the illumination of actual quality control points on the image supported on the table.

14. The combination as set forth in claim 13 wherein the image memory is interfaced to the processor means for receiving zonal display information correlated to the actual image scanned by the video scanner, and means for driving the display means from the image memory thereby to display zonal information correlated to the image supported on the table.

15. The combination as set forth in claim 1 in which the video scanner comprises a video camera aimed at the printed image supported on the table, and an image memory for storing an actual image scanned by said video camera.

16. The combination as set forth in claim 1 further including a video display including an image processor for controlling the image displayed on the video display, processor means for cooperating with the image processor to identify the quality control points on the reference image, said processor means being responsive to a cursor control for defining said quality control points.

17. The combination as set forth in claim 16 in which the image processor includes enlargement means for enlarging a portion of the scanned image on the video display for manipulation by the processor means.

18. A method for deriving quality control information from printed sheets produced on a printing press, the press having zonal control devices including zonal ink metering means for controlling the print quality of corresponding zones of the printed image, the method comprising the steps of:

creating a reference image in a reference image memory which includes reference image data for matching to a scanned image, associating selected quality control points, including control zones and measurement points, with the reference image;

disposing a sheet containing a printed image in a predetermined location with respect to a video scanner and creating a scanned image which is an electronic representation of the printed image scanned by the video scanner;

comparing the scanned image with the reference image to correlate said images and transfer the quality control points for the reference image to the scanned image; and displaying to a press operator the quality control pints on the printed image after translation of said quality control points from the reference image to the scanned image.

* * * * *